United States Patent
Kaya et al.

(10) Patent No.: US 11,405,951 B2
(45) Date of Patent: Aug. 2, 2022

(54) PREAMBLE DETECTION IN WIRELESS NETWORK

(71) Applicant: NOKIA TECHNOLOGIES OY, Espoo (FI)

(72) Inventors: Aliye Kaya, Chatham, NJ (US); Harish Viswanathan, Basking Ridge, NJ (US)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/951,559

(22) Filed: Nov. 18, 2020

(65) Prior Publication Data
US 2021/0160921 A1    May 27, 2021

(30) Foreign Application Priority Data

Nov. 25, 2019   (FI) ...................................... 20196010

(51) Int. Cl.
*H04W 74/00* (2009.01)
*H04W 74/08* (2009.01)

(52) U.S. Cl.
CPC ..... *H04W 74/008* (2013.01); *H04W 74/0833* (2013.01); *H04W 74/0891* (2013.01)

(58) Field of Classification Search
CPC ........... H04W 74/008; H04W 74/0833; H04W 74/0891
See application file for complete search history.

(56) References Cited

U.S. PATENT DOCUMENTS

| | | | | |
|---|---|---|---|---|
| 2014/0376374 | A1* | 12/2014 | Moser | H04W 24/02 370/235 |
| 2017/0273056 | A1* | 9/2017 | Papasakellariou | H04W 52/143 |
| 2018/0242369 | A1 | 8/2018 | Chun et al. | |
| 2018/0324716 | A1* | 11/2018 | Jeon | H04W 74/0833 |
| 2019/0014487 | A1* | 1/2019 | Yang | G06N 3/084 |

(Continued)

FOREIGN PATENT DOCUMENTS

| | | |
|---|---|---|
| CN | 108235444 A | 6/2018 |
| CN | 110139392 A | 8/2019 |
| EP | 3483794 A1 | 5/2019 |

OTHER PUBLICATIONS

Office Action and Search Report dated Mar. 10, 2020 corresponding to Finnish Patent Application No. 20196010.

(Continued)

*Primary Examiner* — Kashif Siddiqui
(74) *Attorney, Agent, or Firm* — Squire Patton Boggs (US) LLP (57) ABSTRACT

This document discloses a solution for preamble detection. According to an aspect, a method comprises: transmitting a message to a first terminal device connected to an access node, the message instructing the terminal device to carry out a random access procedure towards the access node; receiving a signal from the first terminal device during the random access procedure, the signal comprising a random access preamble; using the received signal as a training input in a random access preamble detection process; and using the random access preamble detection process trained with the training input in detection of a random access preamble from a second terminal device not connected to the access node.

13 Claims, 5 Drawing Sheets

(56) References Cited

U.S. PATENT DOCUMENTS

2019/0098672 A1    3/2019   Murray et al.
2020/0068616 A1    2/2020   Qian et al.

OTHER PUBLICATIONS

Communication of Acceptance under section 29a of Patents Decree dated Sep. 30, 2020 corresponding to Finnish Patent Application No. 20196010.
D. Pacheco-Paramo et al: "Deep reinforcement learning mechanism for dynamic access control in wireless networks handling mMTC," Ad Hoc Networks, Elsevier, Jul. 2, 2019, vol. 94.
Chinese Office Action issued in corresponding Chinese Patent Application No. 202011331337.2 dated Oct. 8, 2021.
Chinese Office Action issued in corresponding Chinese Patent Application No. 2020113313372 dated Feb. 21, 2022.

* cited by examiner

PREAMBLE DETECTION IN WIRELESS NETWORK

FIELD

Various embodiments described herein relate to the field of wireless communications and, particularly, to detecting a preamble at an access node.

BACKGROUND

Random access is a procedure where a terminal device, typically disconnected from an access node of a wireless network, contacts the access node on a channel. Such a random access process may be based on the access node defining a limited set of preambles that are dedicated sequences 'tickets' to be used during the random access. The terminal device may select one of the preambles and transmit the preamble to the access node. The access node searches for the limited set of preambles and, upon detecting the preamble, responds to the terminal device with a random access response message.

CN 110139392 discloses a multi-conflict detection method for a random access channel of an LTE power wireless private network. An access detection unit performs the operations, such as receiving signal and base sequence cyclic correlation operation, binarization processing, noise elimination, waveform size adjustment, etc., on the acquired random access channel information; based on a convolutional neural network of deep learning, the coarse training and the fine training of a convolutional neural network detection model are realized, and a final convolutional neural network detection model is obtained, so that the convolutional neural network detection model detects the preamble of a random access channel and recognize the serious degree of the conflict. The method has the beneficial effects that the RACH conflict is detected by adopting the convolutional neural network based on deep learning, the existing protocol stack does not need to be modified, the conflict detection can be completed at the base station, the more accurate conflict detection performance can be obtained, the throughput of the LTE power wireless private network is improved, and the communication delay is reduced.

US 2018/242369 discloses a radio (wireless) communication system providing a radio communication service and the terminal, and more particularly, a method of handling time alignment command during a random access procedure in an Evolved Universal Mobile Telecommunications System (E-UMTS) evolved from the Universal Mobile Telecommunications System (UMTS) or a Long Term Evolution (LTE) system is provided.

US 2019/098672 discloses an apparatus including a non-transitory memory including instructions to perform random access in a beam sweeping network having a cell. The network includes a downlink sweeping subframe, an uplink sweeping subframe and a regular sweeping subframe. The apparatus also includes a processor operably coupled to the non-transitory memory. The processor is configured to execute the instructions of selecting an optimal downlink transmission beam transmitted by the cell during the downlink sweeping subframe. The processor is also configured to execute the instructions of determining an optimal downlink reception beam from the optimal downlink transmission beam. The processor is further configured to execute the instructions of determining a random access preamble and a physical random access channel (PRACH) resource via resource selection from the optimal downlink transmission beam.

US 2018/324716 discloses a wireless device that receives from a base station, one or more messages comprising configuration parameters of a plurality of random access channels for one or more beams of a cell. The wireless device initiates a random access procedure for parallel transmissions of a plurality of random access preambles via the plurality of random access channels for the one or more beams. A plurality of transmission powers corresponding to the parallel transmissions of the plurality of the random access preambles is determined. At least one of the parallel transmissions is dropped if a first calculated transmit power comprising the plurality of transmission powers exceeds a first value. The wireless device transmits, via at least one of the plurality of the random access channels, at least one of the plurality of the random access preambles.

EP 3483794 discloses methods and apparatus, including computer program products, for cloud-based storage for heterogeneous robots. In some example embodiments, there may be provided a method that includes receiving, by a cloud server including a machine learning model in a training phase, training data; storing, by the cloud server, a configuration of the machine learning model; receiving, by the cloud server including the trained machine learning model in an operations phase, a request, from at least one apparatus, for the model training data; creating, by the trained machine learning model in the operations phase, the model training data; and providing, by the cloud server including the trained machine learning model in the operations phase, the response including the model training data to the at least one apparatus. Related systems, methods, and articles of manufacture are also described.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: transmitting a message to a first terminal device connected to the access node, the message instructing the terminal device to carry out a random access procedure towards the access node; receiving a signal from the first terminal device during the random access procedure, the signal comprising a random access preamble; using the received signal as a training input in a random access preamble detection process; and using the random access preamble detection process trained with the training input in detection of a random access preamble from a second terminal device not connected to the access node.

In an embodiment, the message comprises at least one information element indicating the random access preamble to be transmitted by the terminal device in the random access procedure.

In an embodiment, the message further comprises at least one information element indicating an uplink resource in which the terminal device shall perform the random access procedure.

In an embodiment, the means are further configured to attempt, upon receiving the signal, detection of the preamble from the received signal and, upon detecting the preamble in the received signal, associate the received signal with information indicating that the received signal comprises the random access preamble before applying the received signal as the training input.

In an embodiment, the means are configured to label the received signal with information indicating reception timing of the random access preamble before applying the received signal as the training input.

In an embodiment, the information indicating the reception timing of the random access preamble indicates a difference between a timing of the uplink resource and the reception timing.

In an embodiment, the means are further configured to use the random access preamble detection process trained with the training input in time-of-arrival estimation for the random access preamble received from the second terminal device, to determine a timing advance command on the basis of the time-of-arrival estimation, and to transmit a timing advance command to the second terminal device in a random access response message.

In an embodiment, the means are configured to reduce a time alignment timer of the terminal device and to transmit the message when the reduced time alignment timer has expired.

In an embodiment, the means are configured to trigger the transmission of the message upon detecting no data waiting for delivery between the terminal device and the access node.

In an embodiment, wherein the means are configured to repeat said transmitting a message and said receiving a signal for a plurality of terminal devices to acquire sufficient statistics for the training.

According to an aspect, there is provided an apparatus for a terminal device of a wireless network, comprising means for performing: receiving, from an access node connected with the terminal device, a message instructing the terminal device to carry out a random access procedure towards the access node wherein the message is received in a state where the terminal device remains time-synchronized with the access node; performing the random access procedure and transmitting a random access preamble to the access node.

In an embodiment, the means are configured to receive the message while a time alignment timer is still running in the apparatus.

In an embodiment, the message comprises at least one information element indicating the random access preamble to be transmitted by the terminal device in the random access procedure.

In an embodiment, the means are configured to receive the message on a physical downlink control channel.

In an embodiment, the means comprises: at least one processor; and at least one memory including computer program code, the at least one memory and computer program code configured to, with the at least one processor, cause the performance of the apparatus.

According to an aspect, there is provided a method for preamble detection in an access node of a wireless network, the method comprising: transmitting a message to a first terminal device connected to the access node, the message instructing the terminal device to carry out a random access procedure towards the access node; receiving a signal from the first terminal device during the random access procedure, the signal comprising a random access preamble; using the received signal as a training input in a random access preamble detection process; and using the random access preamble detection process trained with the training input in detection of a random access preamble from a second terminal device not connected to the access node.

In an embodiment, the message comprises at least one information element indicating the random access preamble to be transmitted by the terminal device in the random access procedure.

In an embodiment, the message further comprises at least one information element indicating an uplink resource in which the terminal device shall perform the random access procedure.

In an embodiment, the method further comprises attempting, by the access node upon receiving the signal, detection of the preamble from the received signal and, upon detecting the preamble in the received signal, associating the received signal with information indicating that the received signal comprises the random access preamble before applying the received signal as the training input.

In an embodiment, the access node labels the received signal with information indicating reception timing of the random access preamble before applying the received signal as the training input.

In an embodiment, the information indicating the reception timing of the random access preamble indicates a difference between a timing of the uplink resource and the reception timing.

In an embodiment, the access node uses the random access preamble detection process trained with the training input in time-of-arrival estimation for the random access preamble received from the second terminal device, determines a timing advance command on the basis of the time-of-arrival estimation, and transmits a timing advance command to the second terminal device in a random access response message.

In an embodiment, the access node reduces a time alignment timer of the terminal device and transmits the message when the reduced time alignment timer has expired.

In an embodiment, the access node triggers the transmission of the message upon detecting no data waiting for delivery between the terminal device and the access node.

In an embodiment, the access node repeats said transmitting a message and said receiving a signal for a plurality of terminal devices to acquire sufficient statistics for the training.

According to an aspect, there is provided a method for a terminal device of a wireless network, the method comprising: receiving, from an access node connected with the terminal device, a message instructing the terminal device to carry out a random access procedure towards the access node wherein the message is received in a state where the terminal device remains time-synchronized with the access node; performing the random access procedure and transmitting a random access preamble to the access node.

In an embodiment, the message is received while a time alignment timer is still running in the terminal device.

In an embodiment, the message comprises at least one information element indicating the random access preamble to be transmitted by the terminal device in the random access procedure.

In an embodiment, the message is received on a physical downlink control channel.

According to an aspect, there is provided a computer program product embodied on a computer-readable medium and comprising a computer program code readable by a computer, wherein the computer program code configures the computer to carry out a computer process comprising: transmitting a message to a first terminal device connected to the access node, the message instructing the terminal device to carry out a random access procedure towards the access node; receiving a signal from the first terminal device during the random access procedure, the signal comprising a random access preamble; using the received signal as a training input in a random access preamble detection process; and using the random access preamble detection process trained with the training input in detection of a random access preamble from a second terminal device not connected to the access node.

According to an aspect, there is provided a computer program product embodied on a computer-readable medium and comprising a computer program code readable by a computer, wherein the computer program code configures the computer to carry out a computer process comprising: receiving, from an access node connected with the terminal device, a message instructing the terminal device to carry out a random access procedure towards the access node wherein the message is received in a state where the terminal device remains time-synchronized with the access node; performing the random access procedure and transmitting a random access preamble to the access node.

LIST OF DRAWINGS

Embodiments are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
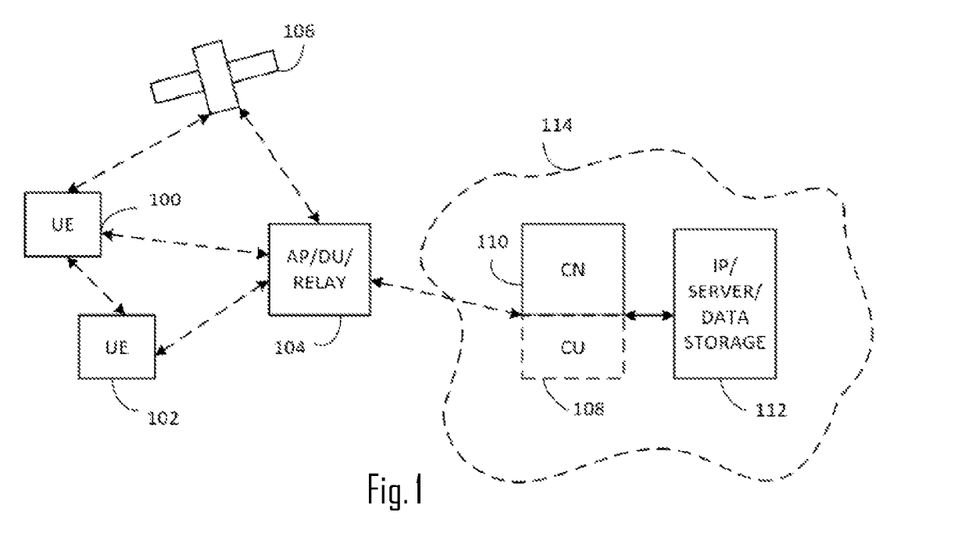
FIG. 1 illustrates a wireless communication scenario to which some embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user apparatus may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

A random access procedure may be utilized by terminal devices 100, 102 to connect to an access node 104. The access node 104 may indicate a set of random access resources, e.g. random access preambles, to use in the random access procedure. A terminal device determining to connect to the access node may select one of the random access preambles and transmit the random access preamble to the access node on a channel. The access node 104 may continuously scan for the random access preambles on the channel. Conventional scanning may be based on correlating a received signal with the set of random access preambles indicated by the access node. Other, more complex solutions are also available with improved performance with the cost of increased complexity. Improvements in the preamble detection may improve the performance of the system.

Figure 2:
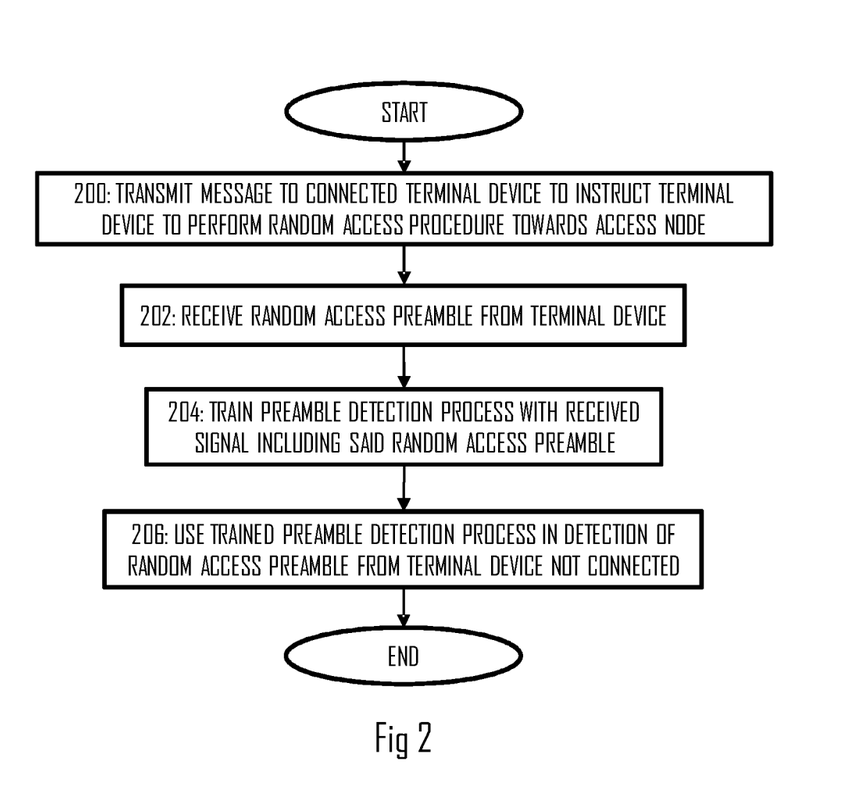
FIGS. 2 and 3 illustrate embodiments of processes for random access preamble detection.
Figure 3:
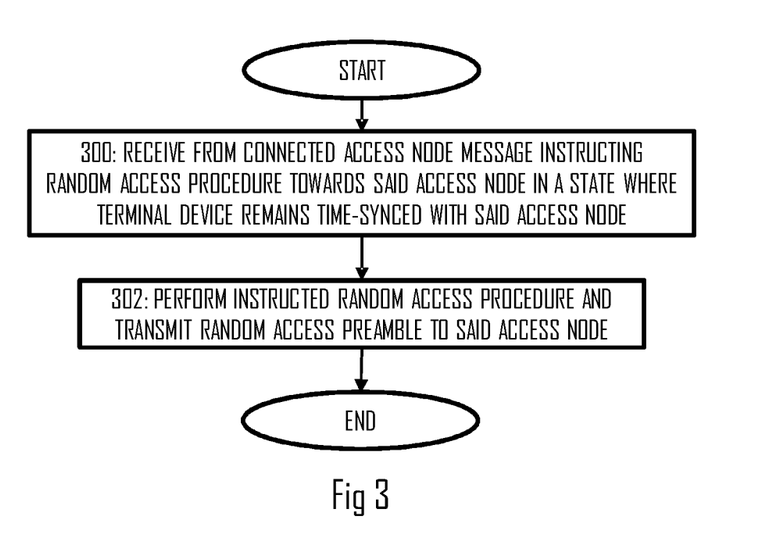

FIGS. 2 and 3 illustrates processes for facilitating the random access preamble detection. FIG. 2 illustrates a process for the access node or another network element of the network infrastructure, while FIG. 3 illustrates a process for the terminal device.

Referring to FIG. 2, the process comprises as performed by the access node or the network element: transmitting (block 200) a message to a first terminal device connected to the access node, the message instructing the first terminal device to carry out a random access procedure towards the access node; receiving (block 202) a signal from the first terminal device during the random access procedure, the signal comprising a random access preamble; using (block 204) the received signal as a training input in a random access preamble detection process; and using (block 206) the random access preamble detection process trained with the training input in detection of a random access preamble from a second terminal device not connected to the access node.

Referring to FIG. 3, the process comprises as performed by the (first) terminal device: receiving (block 300), from an access node connected with the terminal device, a message instructing the terminal device to carry out a random access procedure towards the access node wherein the message is received in a state where the terminal device remains time-synchronized with the access node; and performing (block 302) the random access procedure and transmitting a random access preamble to the access node.

The above-described embodiments thus employ random access preamble(s) gathered from one or more connected terminal devices in training the preamble detection process. This improves the performance of the training in the sense that the access node may select the connected terminal device(s) that shall transmit the preamble(s). Accordingly, the access node may select the terminal devices on the basis of the type of training needed. For example, the access node may in a controlled manner acquire the training inputs from various channel conditions. Thus, the overall performance of the preamble detection process may be improved.

In an embodiment, the message transmitted in block 200 and received in block 300 comprises at least one information element indicating the random access preamble to be transmitted by the terminal device in the random access procedure. Accordingly, the access node knows which preamble to receive from the terminal device in block 202. This facilitates the detection of the preamble in the access node, in particular in a case where the channel conditions are difficult for the preamble detection without the training. Another advantage of this embodiment is that the terminal device can perform a contention-free random access procedure.

In an embodiment, the message transmitted in block 200 and received in block 300 comprises at least one information element indicating an uplink resource in which the terminal device shall perform the random access procedure. This enables the access node to know beforehand the uplink transmission/reception timing, frequency, etc. resource for the random access preamble. Since the access node knows the uplink resource carrying the preamble, the access node may store the received signal from the uplink resource even without attempting detection of the random access preamble and forward the signal as the training input for the training. In another embodiment, the access node may attempt the detection but forward the signal as the training input even in a case where the detection fails. As a consequence, the preamble detection process may be trained with a signal from which the preamble detection currently fails.

In an embodiment, the access node attempts detection of the random access preamble in the received signal. Upon detecting the preamble in the received signal, the access node may label the received signal with information indicating that the received signal comprises the random access preamble before applying the received signal as the training input. The label may comprise at least one of the following information elements: indication of the presence of a random access preamble in the received signal, an index of the random access preamble comprised in the received signal, and an index and a cyclic shift of a logical root sequence of the random access preamble comprised in the received signal. In other words, in the simplest form, the label may only indicate the presence of the preamble, and the training procedure may then detect the actual preamble comprised in the received signal. The other embodiments specifying the random access preamble reduces the burden of the training procedure because the training procedure knows beforehand the preamble comprised in the received signal.

In an embodiment, the access node labels the received signal with information indicating reception timing of the random access preamble before applying the received signal as the training input. The information indicating the reception timing of the random access preamble may indicate a difference between a timing of the uplink resource and the reception timing. Accordingly, the training input may indicate a timing advance error to the training procedure. The random access preamble detection process trained with the training input and the reception timing may then be used in time-of-arrival estimation for a signal received from the second terminal device, and/or in correcting the timing advance error of the second terminal device. The random access preamble detection process trained to detect the preamble in various channel conditions may also improve the detection of the timing advance error. Accordingly, more accurate timing advance correction commands may be issued to the terminal device. In a case of multi-path communication channel, the labelling may use as the time-of-arrival estimate the first detection of the preamble because that typically represents the line-of-sight path.

The concept of time-of-arrival estimation and subsequent timing advance correction commands may be expanded beyond the tie to triggering the random access procedure for a connected terminal device. When collecting the data, the time-of-arrival may be estimated for any received signal received by the access node from multiple terminal devices connected to the access node. The access node may then label received (complex) input signal sequences with the estimated time-of-arrival. Instead of the random access preamble detection process trained in the above-described manner, a timing advance correction process may be trained by using the received signals trained with the time-of-arrival label. Upon training the timing advance correction process with the received signals trained with the time-of-arrival label, the process may be used for estimating a more accurate time-of-arrival value or even a direct timing advance correction value for any terminal device from which the access node receives a signal in a scheduled resource or in a resource whose timing is known to the access node.

In an embodiment, the transmission of the message in block 200 is performed after reducing a time alignment timer of the terminal device. The time alignment timer (TAT) is conventionally used for counting a time interval where the terminal device is considered to remain synchronized with the connected access node. The timer may be implemented in the access node and the terminal device. When the timer expires, terminal device releases all physical uplink control channel (PUCCH) and sounding reference signal (SRS) resource, including scheduling resources and channel quality information configuration, and flushes its hybrid automatic repeat request (HARQ) buffers. Resynchronization may be performed via the random access procedure, and the access node may instruct the terminal device to perform the random access procedure, as described in connection with block 200. When the access node reduces the value of the TAT and, thus, expedites the out-of-sync state of the terminal device as seen by the access node, the access node may also expedite the execution of block 200. From another perspective, by manipulating the TAT the access node may trigger block 200 whenever it needs to trigger it.

In another embodiment, block 200 is triggered without manipulating the TAT, e.g. the access node may trigger block 200 by using an interrupt command that overrides the triggering based on the value of the TAT.

Figure 4:
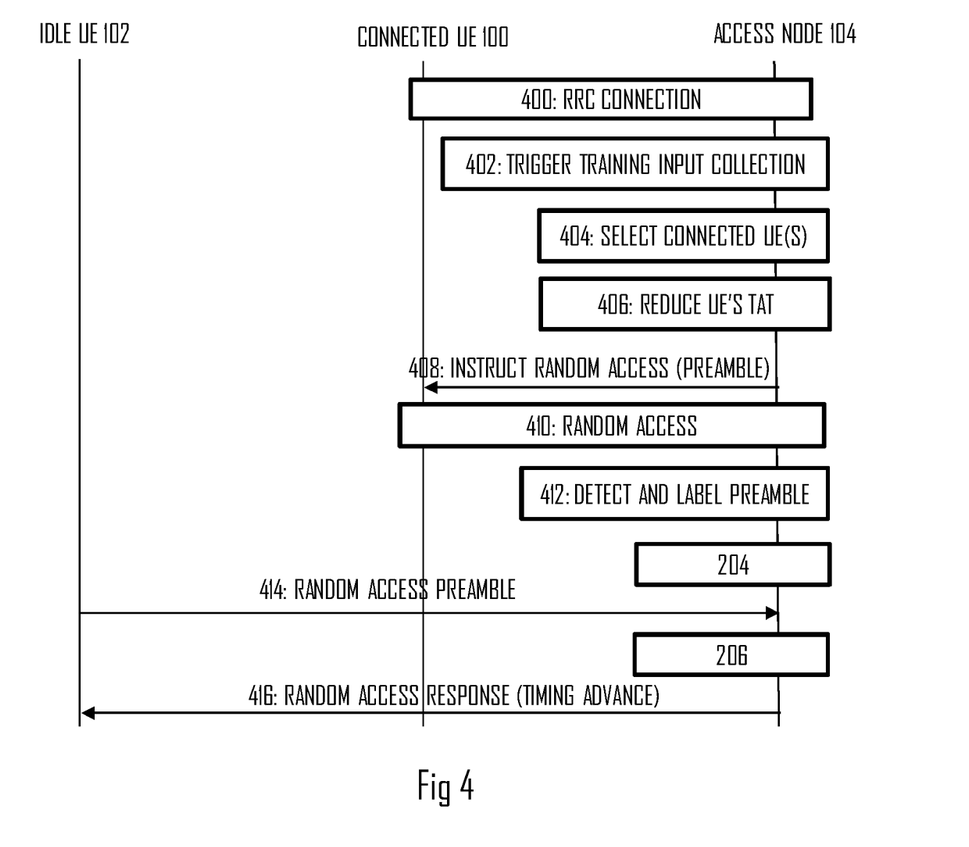
FIG. 4 illustrates a signalling diagram combining the embodiments of FIGS. 2 and 3.

FIG. 4 illustrates a signalling diagram of a procedure that combines the embodiments of FIGS. 2 and 3. Let us assume that the terminal device (UE) 100 is the above-described first terminal device connected to the access node 104, and the terminal device 102 is the above-described second terminal device that is idle with respect to the access node 104. Referring to FIG. 4, the procedure may start with the terminal device 100 and the access node 104 establishing a radio resource control (RRC) connection in block 400. The RRC connection may be established according to the specifications of the LTE or 5G, for example. The terminal device 100 and the access node may transmit data over the RRC connection.

In block 402, the access node 104 triggers the collection of the training input for the random access preamble detection process. As a consequence, the access node 104 selects one or more terminal devices to provide the training input (block 404). Embodiments of the selection process are described below. The access node 104 may select a high number of terminal device to acquire sufficient statistics for the training, e.g. dozens or hundreds of terminal devices at various traffic and/or channel conditions. Upon selecting the terminal device 100, the access node may manipulate the TAT of the selected terminal device 100 in block 406 by reducing the value of the TAT more than would be the nominal operation of the TAT. When, the TAT expires, the access node executes block 200 and transmits the instruction to execute the random access procedure (step 408). As described above, the instruction may carry the random access preamble to be used in the random access procedure.

In an embodiment, the instruction is transmitted on a physical downlink control channel (PDCCH). In an embodiment, the instruction is a PDCCH order used conventionally to bring an out-of-sync terminal device back to in-sync state in a case where the access node has new downlink data available for the terminal device. In the current embodiment, there may or may not be new downlink data available for the terminal device, i.e. the presence of the data is not a trigger for transmitting the instruction in step 408. In fact, it may be beneficial to carry out the procedure in a situation where there is no data to be delivered between the terminal device 100 and the access node 104 because the training input collection can be carried out without causing reduction in data throughput or user experience. Since the access node has reduced the TAT, the TAT may still be running at the terminal device in step 408.

Upon receiving the instruction in step 408, the terminal device may execute the random access procedure towards the access node in block 410. Block 410 may comprise the terminal device 100 transmitting the random access preamble in the uplink resource indicated by the access node in the instruction in step 408. Upon receiving a signal in the uplink resource, the access node may attempt detection of the random access preamble (block 412) by using a random access preamble detection process that may be the conventional process such as the correlator-based process. In such a case, the access node may employ two alternative processes: the conventional process having no training capability and the process with the training capability. Alternatively, the random access preamble detection process used in block 412 may be the random access preamble detection process with the training capability. Upon detecting the preamble in the received signal and, optionally, further information such as time-of-arrival of the preamble, the access node may label the received signal with the corresponding information, as described above.

The access node may perform steps 406 to 412 for all the terminal devices selected in block 404. Upon acquiring a sufficient amount of training data, block 204 may be executed. When the random access preamble detection process has been trained, the trained process may be used in detection of random access preambles from the terminal device 102. When the terminal device 102 performs the random access procedure towards the access node 104 in step 414, the access node may be unaware of the random access preamble selected by the terminal device 102 and the uplink resource where the terminal device 102 transmits the preamble. The channel conditions between the terminal device 102 and the access node 104 are also unknown. With the trained random access preamble training process, the access node 104 has improved capabilities for detecting the random access preamble in block 206.

If the access node has also implemented the training for the time-of-arrival estimation and timing advance detection, as described above, block 206 may include detecting the timing advance error and/or time-of-arrival of the received preamble. If the preamble detection process has been trained to detect the time-of-arrival, process 206 may include computing the timing advance error with the knowledge of the time-of-arrival of the preamble in step 414 and a start time of an uplink resource of the random access channel in which the preamble was received. The time difference between these two indicates the timing advance error, and the access node may compute a timing advance command on the basis of the timing advance error to compensate for the timing advance error. In step 416, the access node may transmit to the terminal device 102 a random access response comprising the timing advance error.

Figure 5:
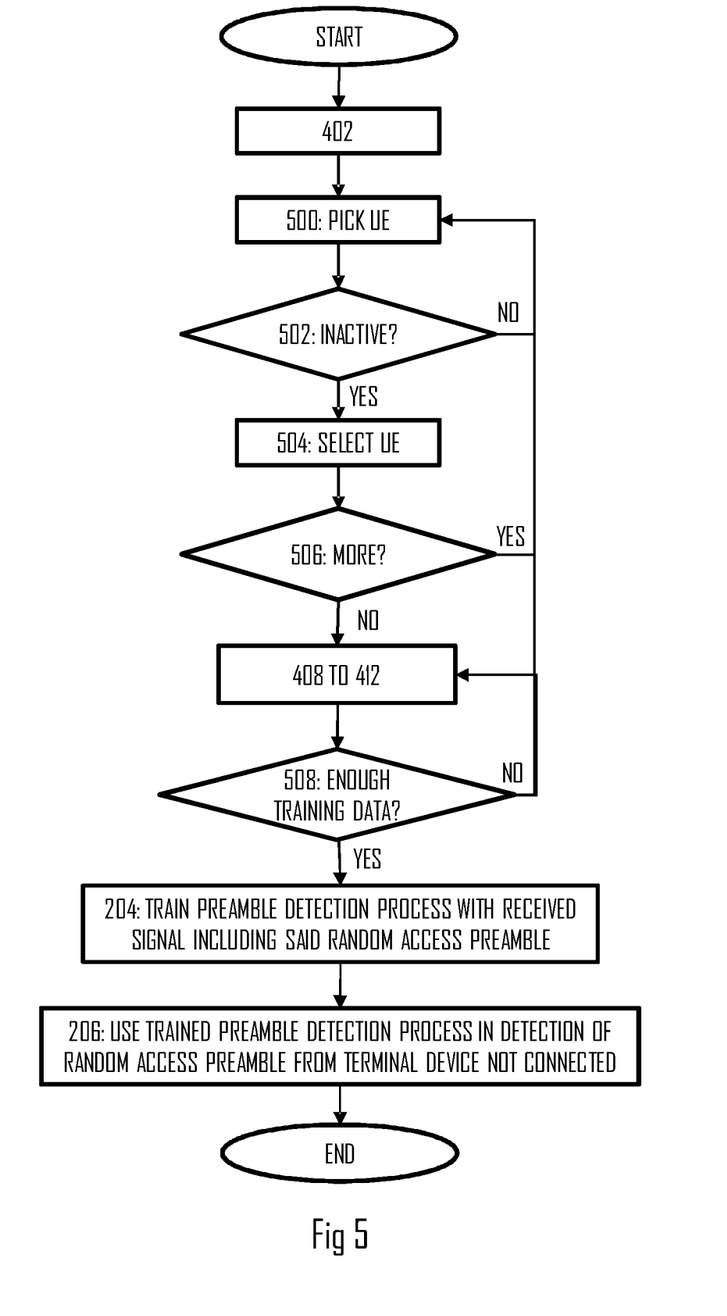
FIG. 5 illustrates a training data acquisition process according to an embodiment

Let us then describe the procedure for acquiring the training inputs in greater detail with reference to FIG. 5. Referring to FIG. 5, upon triggering the training input acquisition in block 402, a potential terminal device connected to the access node may be selected in block 500. In block 502, it is determined whether or not the terminal device is suitable for the training input acquisition. Block 502 may comprise determining whether or not the connected terminal device is currently inactive, e.g. whether or not there is currently uplink/downlink data waiting to be transferred from/to the terminal device. If the terminal device is detected to active, e.g. there is currently downlink data to be transmitted to the terminal device, the process may return to block 500 for selection of another connected terminal device. If the terminal device is determined to be inactive and suitable, the terminal device is selected in block 504. Then, it may be determined whether or not more terminal devices shall be selected (block 506). Block 506 may include evaluating the channel conditions of currently connected terminal devices, for example, and cross-referencing the channel conditions with channel conditions of training data previously used as training input. The access node may attempt to select terminal devices at various channel conditions for the acquisition of the training input, thus training the random access preamble detection process to detect the preambles at various channel conditions. Upon determining to select further terminal devices, the process may return from block 506 to block 500. Otherwise, the process may proceed to acquire the preambles from the selected terminal devices. Accordingly, steps 408 to 412 may be performed for each selected terminal device at least once.

In block 508, it is determined whether or not a sufficient amount of preambles for the training input has been acquired. If enough training data has been acquired, the process may proceed to block 204. Otherwise, the process may return to block 500 for selecting new terminal device(s), or to block 408 for repeating the blocks 408 to 412 for the readily selected terminal device(s).

Figure 6:
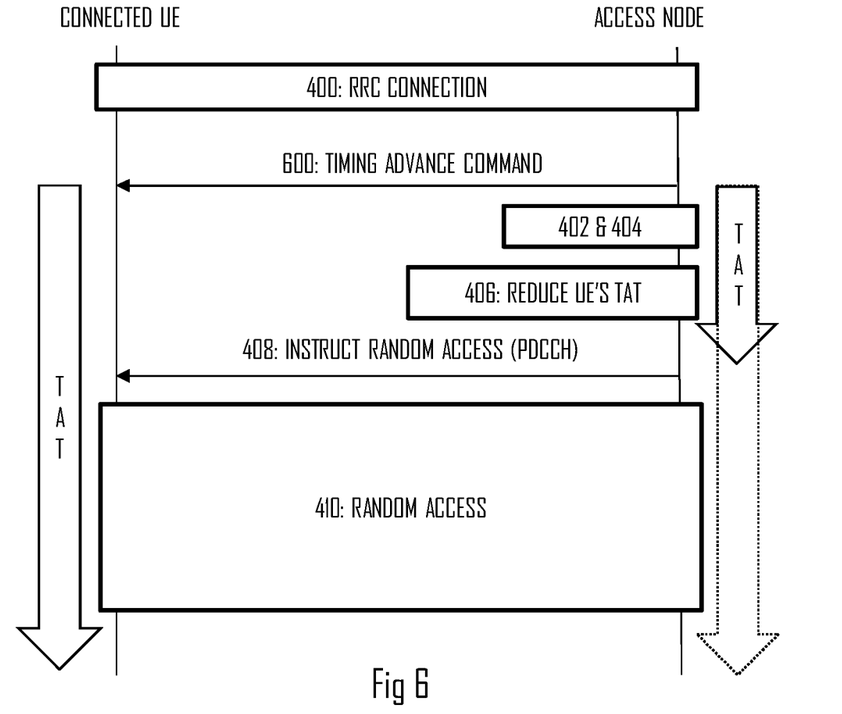
FIG. 6 illustrates manipulation of a timer for triggering premature random access procedure for a connected terminal device

FIG. 6 illustrates the effect of reducing the TAT at the access node in greater detail. As described above, the TAT may be started upon the access node transmitting the timing advance command that corrects timing advance error of the connected terminal device (step 600). Upon transmitting/receiving the timing advance command, the access node and the terminal device may start the TAT. The TATs may be initially configured to count the same time interval, as illustrated by the long TAT arrows in FIG. 6. Since the access node manipulates the TAT value by reducing it, the TAT expires at the access node in advance. Step 408 (and even the random access procedure in block 410) may thus be carried out while the TAT is still running at the terminal device and the terminal device is in fact in-sync with the access node.

In an embodiment, the random access preamble detection process using, as the training input, the random access preambles acquired according to any one of the embodiments described above uses a neural network. The neural network may be a convolutional neural network or a deep neural network, or a combination thereof. Operation of the neural network may be logically separated into two steps: training and inference. In the training phase, the training input is acquired, comprising the input sequence(s) and label(s), as described above. An input sequence may include an in-phase (I) and a quadrature (Q) component of the received signal. Thus, a received signal of length 4095 samples may be represented by a 4095×2 matrix. The labels may include the information element(s) described above. Once the neural network has been trained, a signal received from the idle terminal device 102 may be processed with the trained neural network in order to predict the presence of the random access preamble and/or the time of arrival of the random access preamble.

Figure 7:
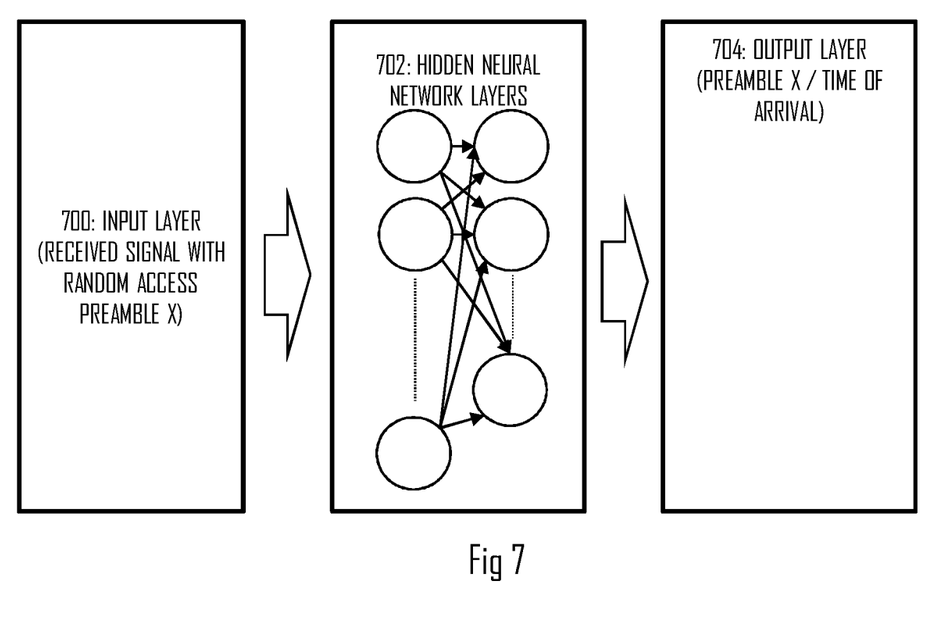
FIG. 7 illustrates an embodiment of a neural network suitable for a random access preamble detection process.

Let us then describe a structure of the neural network during the training phase and the inference phase with reference to FIG. 7. Referring to FIG. 7, an input layer 700 of the neural network may comprise the received signal. In the training phase, input layer may comprise the signal received in step 410. In the inference phase, the input layer may comprise the signal received in step 412. The input layer may convert the parallel I and Q signals into a serial form for the neural network. The conversion may be carried out by using state-of-the art function(s). The neural network also comprises one or multiple hidden layers 702 that comprise a network of nodes that process the inputs received from the input layer into an output represented by an output layer 704. In an embodiment, the neural network comprises multiple hidden layers between the input layer and output layer. Interconnections between the nodes and weightings performed in the neural network define how the neural network responds to a particular input, and the weightings are adjusted during the training phase. In the training phase, the output layer 704 is filled with the label(s) generated in block 412. Since the neural network knows the input and the output in the training phase, it may adjust the hidden layers 702 so that the mapping between the input layer and the output layer is realized by the hidden layers. In the inference phase, the output layer is naturally not entered beforehand but filled by the hidden layers as a response to the input received in step 412. The output layer may then comprise the information elements the neural network is trained to output, e.g. an indication of whether or not the input layer comprises a random access preamble, an index of the random access preamble, a time-of-arrival of the random access preamble, etc.

Figure 8:
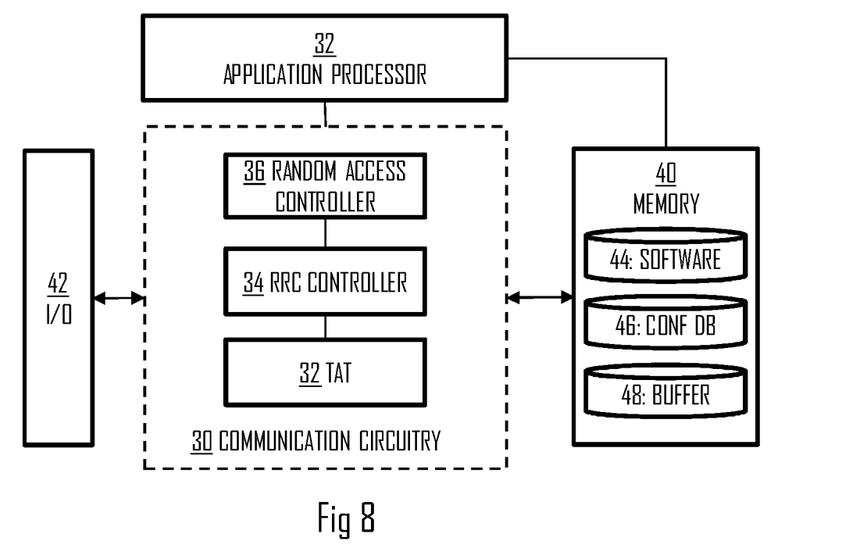
FIGS. 8 and 9 illustrate block diagrams of structures of apparatuses according to some embodiments of the invention.

FIG. 8 illustrates an embodiment of a structure of the above-mentioned functionalities of an apparatus executing the functions of the terminal device 100 in the embodiments described above, e.g. the process of FIG. 3 or any one of its embodiments. The apparatus may be a terminal device or a client device of a wireless network, e.g. an LTE or 5G based cellular communication network. In other embodiments, the apparatus may be a circuitry or an electronic device realizing some embodiments of the invention in the terminal device. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention.

Referring to FIG. 8, the apparatus may comprise at least one processor or a processing circuitry comprising a communication circuitry 30 providing the apparatus with capability of communicating in the wireless network of the access node 104. The communication circuitry 30 may employ a radio interface 42 providing the apparatus with radio communication capability. The radio interface 42 may support the random access procedure, for example. It may comprise radio frequency converters and components such as an amplifier, filter, frequency-converter, (de)modulator, and encoder/decoder circuitries and one or more antennas. The communication circuitry 30 or the radio interface 42 may comprise a radio modem configured to carry out transmission and reception of messages in the wireless network.

The processing circuitry 30 may further comprise a RRC controller 34 managing the connections of the terminal device. The RRC controller may, for example, control the random access controller 36 to carry out the above-described random access procedure. The RRC controller may also control the timing advance of the terminal device and control the operation of the TAT 32 at the terminal device.

The apparatus may further comprise an application processor 32 executing one or more computer program applications that generate a need to transmit and/or receive data through the communication circuitry 30. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

The processing circuitry may comprise at least one processor. The apparatus may further comprise a memory 40 storing one or more computer program products 44 configuring the operation of said processor(s) of the apparatus. The memory 40 may further store a configuration database 46 storing operational configurations of the apparatus. The configuration database 46 may, for example, store the configuration of the TAT 32. The memory 40 may further store a data buffer for uplink data waiting for transmission.

Figure 9:
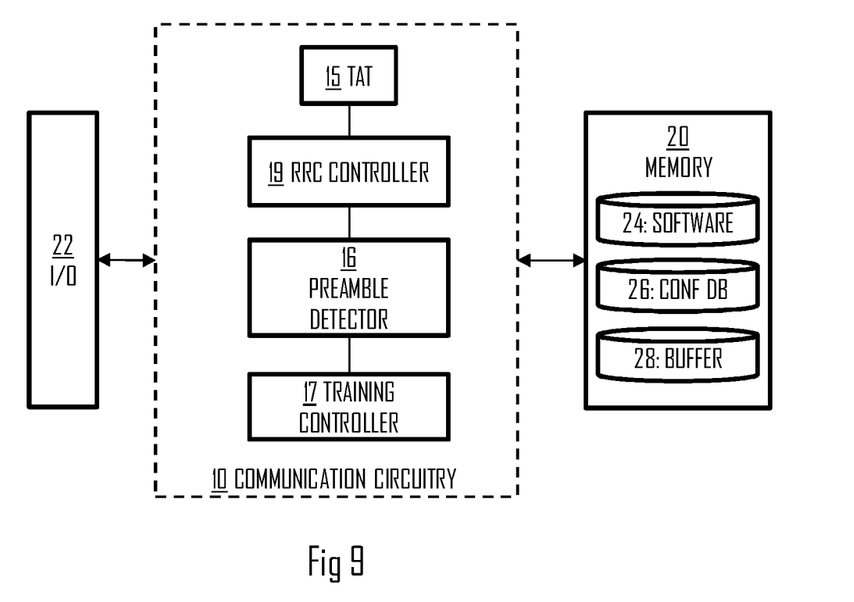

FIG. 9 illustrates an apparatus comprising a communication circuitry 10, such as at least one processor or processing circuitry, and at least one memory 20 including a computer program code (software) 24, wherein the at least one memory and the computer program code (software) are configured, with the at least one processor, to cause the apparatus to carry out the process of FIG. 2 or any one of its embodiments described above. The apparatus may be for the access node (e.g. the gNB), or a controller controlling the operation of the access node according to the embodiments of the invention, e.g. by triggering the acquisition of the training data and training the random access preamble detection process. The apparatus of FIG. 9 may be an electronic device.

Referring to FIG. 9, the memory 20 may be implemented using any suitable data storage technology, such as semi-conductor based memory devices, flash memory, magnetic memory devices and systems, optical memory devices and systems, fixed memory and removable memory. The memory may comprise a configuration database 26 for storing configuration parameters, e.g. the parameters of the random access preamble detection process such as the structure of the neural network. The memory 20 may further store a data buffer 28 for downlink data waiting for transmission to the terminal devices 100, 102.

The apparatus may further comprise a communication interface 22 comprising hardware and/or software for realizing communication connectivity according to one or more communication protocols. The communication interface 22 may provide the apparatus with radio communication capabilities in a wireless network, e.g. a radio access network of a cellular communication system. The radio communication capability may be provided in embodiments where the apparatus is the access node. In other embodiments, the communication interface may support a wired communication protocol, e.g. when the apparatus is a controller physically separate from the access node. The communication interface may comprise standard well-known analog radio components such as an amplifier, filter, frequency-converter and circuitries, conversion circuitries transforming signals between analog and digital domains, and one or more antennas.

The communication circuitry 10 may comprise an RRC controller 19 configured to manage RRC connections with terminal devices connected to the access node. The RRC controller may control the timing advance of the terminal devices, for example, and operate the TAT 15 at the access node. The RRC controller may manipulate the TAT and control the transmission of the message (block 200) according to the embodiments described above. The communication circuitry 10 may further comprise one or more preamble detectors 16 configured to detect random access preambles from the received signals. As described above, the apparatus may comprise a correlator or another conventional preamble detector to be used in block 412, and the preamble detector with the training capability for use at least in block 206. The communication circuitry 10 may further comprise a training controller 17 configured to execute or control the process of Figure S.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIGS. 2 to 6 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for an access node of a wireless network, comprising:
   at least one processor; and
   at least one memory including computer program code, wherein the at least one memory and computer program code are configured, with the at least one processor, to cause the apparatus to perform:
   transmitting a message to a first terminal device connected to the access node, the message instructing the first terminal device to carry out a random access procedure towards the access node;
   determining an activity state of the first terminal device;
   receiving a signal from the first terminal device during the random access procedure based on the determination of the activity state of the first terminal device, the signal comprising a random access preamble;
   using the received signal as a training input in a random access preamble detection process; and
   using the random access preamble detection process trained with the training input in detection of a random access preamble from a second terminal device not connected to the access node.

2. The apparatus of claim 1, wherein the message comprises at least one information element indicating the random access preamble to be transmitted by the terminal device in the random access procedure.

3. The apparatus of claim 1, wherein the message further comprises at least one information element indicating an uplink resource in which the terminal device shall perform the random access procedure.

4. The apparatus of claim 1, wherein the at least one memory and computer program code are configured, with the at least one processor, to cause the apparatus to attempt, upon receiving the signal, detection of the preamble from the received signal and, upon detecting the preamble in the received signal, associate the received signal with information indicating that the received signal comprises the random access preamble before applying the received signal as the training input.

5. The apparatus of claim 1, wherein the at least one memory and computer program code are configured, with the at least one processor, to cause the apparatus to label the received signal with information indicating reception timing of the random access preamble before applying the received signal as the training input.

6. The apparatus of claim 5, wherein the information indicating the reception timing of the random access preamble indicates a difference between a timing of the uplink resource and the reception timing.

7. The apparatus of claim 1, wherein the at least one memory and computer program code are configured, with the at least one processor, to cause the apparatus to use the random access preamble detection process trained with the training input in time-of-arrival estimation for the random access preamble received from the second terminal device, to determine a timing advance command on the basis of the time-of-arrival estimation, and to transmit a timing advance command to the second terminal device in a random access response message.

8. The apparatus of claim 1, wherein the at least one memory and computer program code are configured, with the at least one processor, to cause the apparatus to reduce a time alignment timer of the terminal device and to transmit the message when the reduced time alignment timer has expired.

9. The apparatus of claim 1, wherein the at least one memory and computer program code are configured, with the at least one processor, to cause the apparatus to trigger the transmission of the message upon detecting no data waiting for delivery between the terminal device and the access node.

10. The apparatus of claim 1, wherein the at least one memory and computer program code are configured, with the at least one processor, to cause the apparatus to repeat said transmitting a message and said receiving a signal for a plurality of terminal devices to acquire sufficient statistics for the training.

11. A method for preamble detection in an access node of a wireless network, the method comprising:
- transmitting a message to a first terminal device connected to the access node, the message instructing the first terminal device to carry out a random access procedure towards the access node;
- determining an activity state of the first terminal device;
- receiving a signal from the first terminal device during the random access procedure based on the determination of the activity state of the first terminal device, the signal comprising a random access preamble;
- using the received signal as a training input in a random access preamble detection process; and
- using the random access preamble detection process trained with the training input in detection of a random access preamble from a second terminal device not connected to the access node.

12. The method of claim 11, further comprising attempting, by the access node upon receiving the signal, detection of the preamble from the received signal and, upon detecting the preamble in the received signal, associating the received signal with information indicating that the received signal comprises the random access preamble before applying the received signal as the training input.

13. The method of claim 11, wherein the access node labels the received signal with information indicating reception timing of the random access preamble before applying the received signal as the training input.

* * * * *